United States Patent
Collings

(10) Patent No.: US 7,459,090 B1
(45) Date of Patent: Dec. 2, 2008

(54) STORMWATER TREATMENT SYSTEM AND METHOD

(75) Inventor: Patrick X. Collings, Mechanicsburg, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 3 days.

(21) Appl. No.: 11/741,173

(22) Filed: Apr. 27, 2007

(51) Int. Cl.
*B01D 21/02* (2006.01)

(52) U.S. Cl. .................. 210/747; 210/801; 210/170.03; 210/521; 210/532.1; 210/538

(58) Field of Classification Search .................. 210/747, 210/801, 170.03, 521, 532.1, 538, 540
See application file for complete search history.

(56) References Cited

U.S. PATENT DOCUMENTS

| | | | |
|---|---|---|---|
| 18,293 A | 2/1857 | Naughten | |
| 2,782,929 A | 2/1957 | Colket | 210/60 |
| 3,804,252 A * | 4/1974 | Rishel | 210/532.1 |
| 4,422,931 A | 12/1983 | Wolde-Michael | 210/168 |
| 4,957,621 A * | 9/1990 | Rohloff | 210/521 |
| 5,004,537 A | 4/1991 | Brown | 210/192 |
| 5,100,545 A * | 3/1992 | Brooks | 210/538 |
| 5,122,280 A * | 6/1992 | Russell et al. | 210/532.1 |
| 5,204,000 A * | 4/1993 | Steadman et al. | 210/521 |
| 5,242,584 A | 9/1993 | Hoarau | 210/170 |
| 5,266,191 A | 11/1993 | Greene et al. | 210/195.1 |
| 5,433,845 A | 7/1995 | Greene et al. | 210/170 |
| 5,500,132 A | 3/1996 | Elmi | 210/708 |
| 5,558,780 A | 9/1996 | Vancac | 210/801 |
| 5,746,911 A | 5/1998 | Pank | 210/170 |
| 5,759,415 A | 6/1998 | Adams | 210/776 |
| 6,077,448 A | 6/2000 | Tran-Quoc-Nam et al. | 210/790 |
| 6,086,756 A * | 7/2000 | Roy | 210/170.03 |
| 6,190,545 B1 | 2/2001 | Williamson | 210/155 |
| 6,350,374 B1 | 2/2002 | Stever et al. | 210/170 |
| 6,676,832 B2 * | 1/2004 | de Bruijn et al. | 210/170.03 |
| 6,783,683 B2 | 8/2004 | Collings | 210/669 |
| 6,907,997 B2 | 6/2005 | Thacker et al. | 210/521 |
| 7,022,243 B2 * | 4/2006 | Bryant | 210/747 |
| 2001/0013489 A1 | 8/2001 | Williamson | 210/153 |

* cited by examiner

*Primary Examiner*—Christopher Upton
(74) *Attorney, Agent, or Firm*—Hooker & Habib, P.C.

(57) ABSTRACT

A separator for stormwater includes a long, U-shaped sediment chamber and an oil chamber.

18 Claims, 3 Drawing Sheets

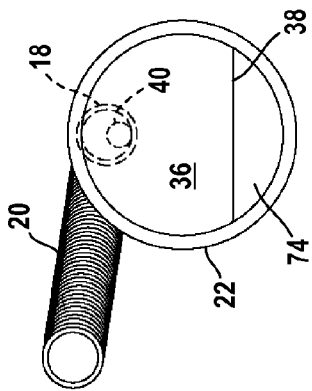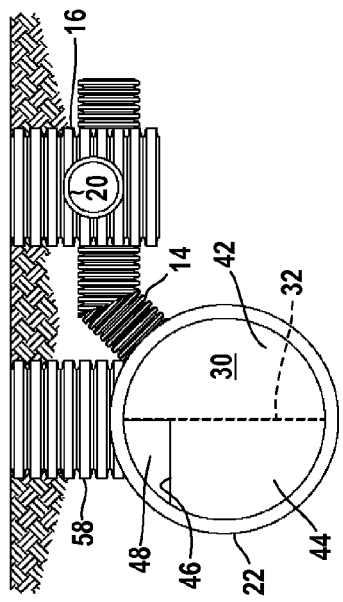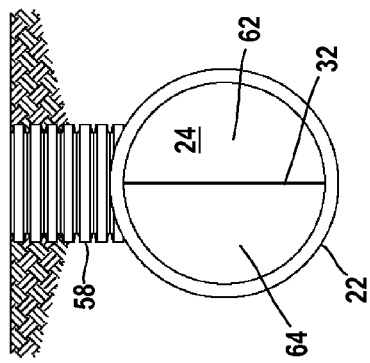

STORMWATER TREATMENT SYSTEM AND METHOD

FIELD OF THE INVENTION

The invention relates generally to stormwater treatment, and particularly to a system and method for separating sediment and other pollutants from stormwater.

BACKGROUND OF THE INVENTION

Stormwater runoff is a major source of water pollution of lakes, rivers, and streams. Runoff from parking lots, construction sites, and agricultural areas contain sediment, oil, and other pollutants.

Stormwater treatment systems have been developed to remove pollutants from stormwater runoff. In one system, stormwater flows into an inlet conduit connected to a buried water quality separator that removes pollutants from the stormwater. Stormwater flows into one end of the separator and flows longitudinally along the length of the separator through a sediment chamber and an oil chamber and out the other end of the separator.

The known water quality separator includes an elongate tubular body that surrounds the sediment and oil chambers. The inlet conduit opens into one end of the body, and the stormwater flows through the body to a discharge conduit at the other end of the body. The flow area of the body is larger than the flow area of the inlet conduit. This enables the stormwater to flow through the sediment chamber and oil chamber slowly enough for the sediment to settle and for the floating pollutants to float to the top of the flow.

Although the known water quality separators work reasonably well, there is room for improvement. The sudden increase in flow area from the inlet conduit into the body causes turbulent flow as the stormwater enters the body. Sediment does not settle out of turbulent flow. The flow must expand and slow before becoming a non-turbulent or laminar flow that allows the solids to settle down into the bottom of the separator under the influence of gravity. The length of the upstream or expansion portion of the sediment chamber required to convert turbulent flow into laminar flow reduces the length of the sediment chamber available for laminar flow and settling of entrained solids and decreases the efficiency of the separator in removing solids from stormwater flowing through the separator.

Thus, there is a need for an improved stormwater separator with a sediment chamber having a longer sediment portion that more efficiently separates solids from stormwater runoff. An improved water separator should remove solids from stormwater more efficiently that conventional separators without increasing the overall length of the separator.

SUMMARY OF THE INVENTION

The invention is an improved water quality separator that more efficiently removes sediment from stormwater runoff without increasing the length of the separator.

A water quality separator in accordance with the present invention includes an elongate body surrounding a U-shaped sediment chamber having two legs joined at a reverse bend and an increased travel length for sediment removal. An inlet located in the central portion of the separator flows stormwater into a first leg of the sediment chamber and an outlet flows stormwater out of a second leg of the chamber. The outlet is placed above the bottom of the chamber so that sediment settles below the outlet before the stormwater exits the chamber.

In a preferred embodiment of the invention, the stormwater separator includes an elongate tubular body having upstream and downstream bulkheads closing the ends of the body and an interior bulkhead extending across the body between the end bulkheads. A U-shaped sediment chamber is located in the body between the upstream bulkhead and the interior bulkhead. A vertical wall extends longitudinally along the interior of the body from the interior bulkhead to an end spaced from the upstream bulkhead to define a U-shaped sediment chamber extending from the interior bulkhead to the upstream bulkhead, around an opening at the end of the vertical wall and then back to the interior bulkhead. An inlet port flows turbulent stormwater into an expansion portion of the sediment chamber extending from the central bulkhead a distance along the vertical wall. The turbulent stormwater flows along the expansion portion, slows and flows along a J-shaped laminar flow sediment portion of the sediment chamber extending from the expansion portion further along the wall, through the opening between the end of the wall and the upstream bulkhead and along the opposite side of the wall back to the central bulkhead.

The central bulkhead forms a weir plate at the downstream end of the sediment chamber for discharge of water from the sediment chamber into an oil chamber, where oil and floating debris are collected. Treated water flows from the oil chamber for discharge through an outlet port in the downstream bulkhead.

Turbulent water is discharged into the expansion portion of the sediment chamber and flows toward the upstream bulkhead. During flow through the expansion portion of the chamber, turbulence is decreased and turbulent flow is converted to laminar flow as the water moves into the J-shaped settlement portion of the chamber. Solids entrained with the flow gravity-settle from the flow during movement along this portion of the chamber and are collected in the bottom of the chamber. Sediment-free or nearly sediment free stormwater is discharged from the sediment chamber over the weir plate and into the oil chamber where oil and floating contaminants are collected prior to discharge of water from the separator. The U-shaped sediment chamber, with flows in opposite directions along the length of the separator, has an increased travel length over the length of sediment chambers in conventional stormwater separators and provides improved gravity sedimentation of solids entrained in water flowed through the chamber. Improved sediment is achieved by reducing turbulence in stormwater before the stormwater enters the sediment portion of the chamber.

The U-shaped chamber can be easily constructed using readily available plate material. Complicated baffling or flow expansion structures can be eliminated. The improved sediment separator can be used in series with other treatment stations, and the maximum desired flow rate through the sediment separator can be regulated by placing a flow restriction in the water quality structure downstream from the sediment separator.

Other objects and features of the present invention will become apparent as the description proceeds, especially when taken in conjunction with the accompanying three drawing sheets illustrating an embodiment of the invention.

BRIEF DESCRIPTION OF THE DRAWINGS

FIG. 3 is a sectional view taken along line 3-3 of FIG. 1;
FIG. 4 is a sectional view taken along line 4-4 of FIG. 1; and
FIG. 5 is a sectional view taken along line 5-5 of FIG. 1

DESCRIPTION OF THE PREFERRED EMBODIMENT

Figure 1:
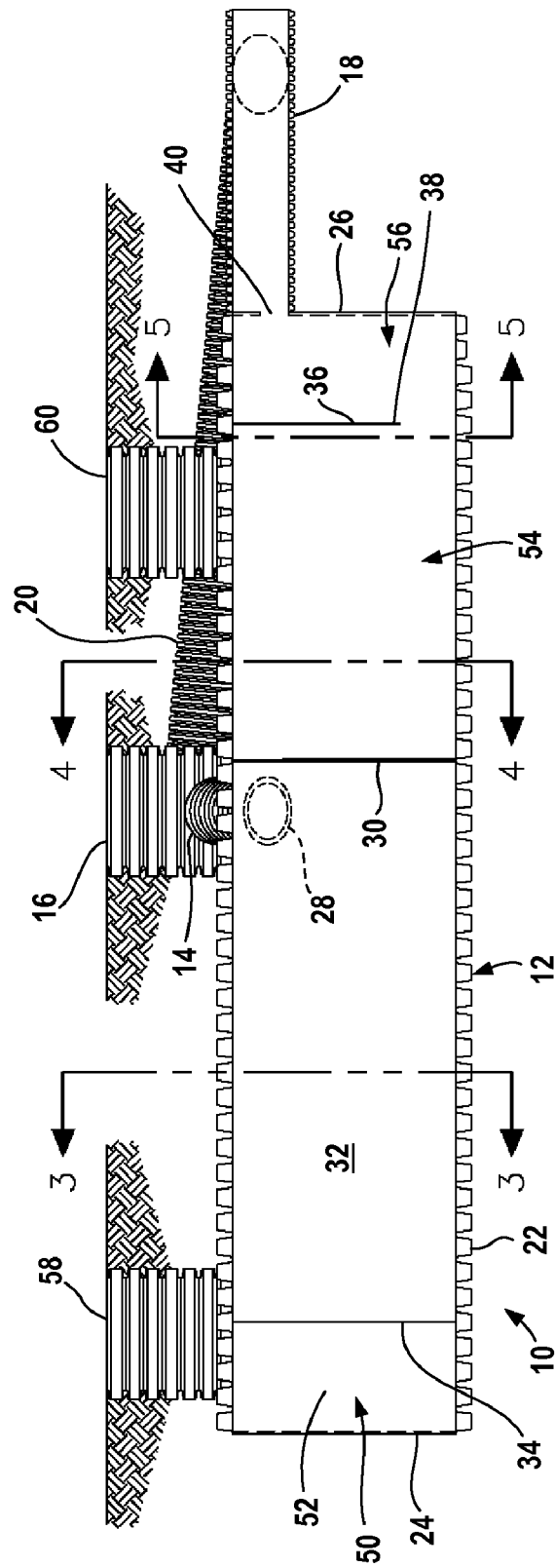
FIG. 1 is a vertical sectional view of a buried treatment system in accordance with the present invention.

The figures illustrate a buried stormwater treatment system 10 including separator 12, stormwater inlet conduit 14, inlet conduit inspection and clean out riser 16, discharge conduit 18 and by-pass conduit 20 extending from riser 16 to conduit 18.

Separator 12 includes an elongate cylindrical body 22 having upstream bulkhead 24 closing the upstream end of the body, and downstream bulkhead 26 closing the downstream end of the body. Inlet conduit 14 opens into the interior of body 22 at inlet port 28 located in the central portion of the body, between bulkheads 24 and 26 and adjacent the top of the body as illustrated in FIGS. 1 and 4. Interior bulkhead 30 extends across the interior of body 22 between port 28 and bulkhead 26 a short distance from inlet port 28. A vertical divider wall 32 is joined to the top and bottom of the body 22 and to the bulkhead 30. The wall 32 extends from the bottom of the body 22 to the top of the body 22 and from interior bulkhead 30 to end 34 located a short distance from upstream bulkhead 24 to provide opening 52 between end 34 and bulkhead 24. Siphon plate 36 extends across the interior of body 22 between downstream bulkhead 26 and interior bulkhead 30 and extends downwardly from the top of the body 22 to lower edge 38 located a distance above the bottom of body 22. Discharge opening 40 in downstream bulkhead 26 opens into discharge conduit 18.

Interior bulkhead 30 forms a closed wall 42 extending from vertical wall 32 to the side of body 22 adjacent port 28. Bulkhead 30 also forms weir plate 44 extending from vertical wall 32 to the opposite side of body 22 and up from the bottom of the body 22 to horizontal dam 46 at the top of the plate 44 to define discharge opening 48 at the top of the plate.

Separator 12 includes a U-shaped sediment chamber 50 extending along one side of body 22 from closed wall 42 past inlet port 28 to bulkhead 24, around a reverse or U-bend at opening 52 located between plate end 34 and bulkhead 24 and then back along the opposite side of body 22 to weir plate 44.

Chamber 50 includes like, uniform cross sectional straight and parallel legs 62 and 64 located on opposite sides of vertical wall 32. Leg 62 extends from wall 42 to bulkhead 24. Leg 64 extends from bulkhead 24 to wall 44 with weir edge 46. Legs 62 and 64 join at opening 52 to permit stormwater runoff discharged into the separator 12 through inlet port 28 to flow along the U-shaped chamber to the weir plate of wall 44 for discharge over dam 46 and into oil chamber 54. Water in legs 62 and 64 flows in opposite directions along plate 32.

Oil separation chamber 54 extends from interior bulkhead 30 downstream to siphon plate 36. Clear water chamber 56 extends from the siphon plate 36 to the downstream bulkhead 26. Cleanout and inspection riser 58 is attached to body 22 above end 34 of wall 32. Cleanout and inspection riser 60 is attached to body 22 above oil chamber 54.

Figure 2:
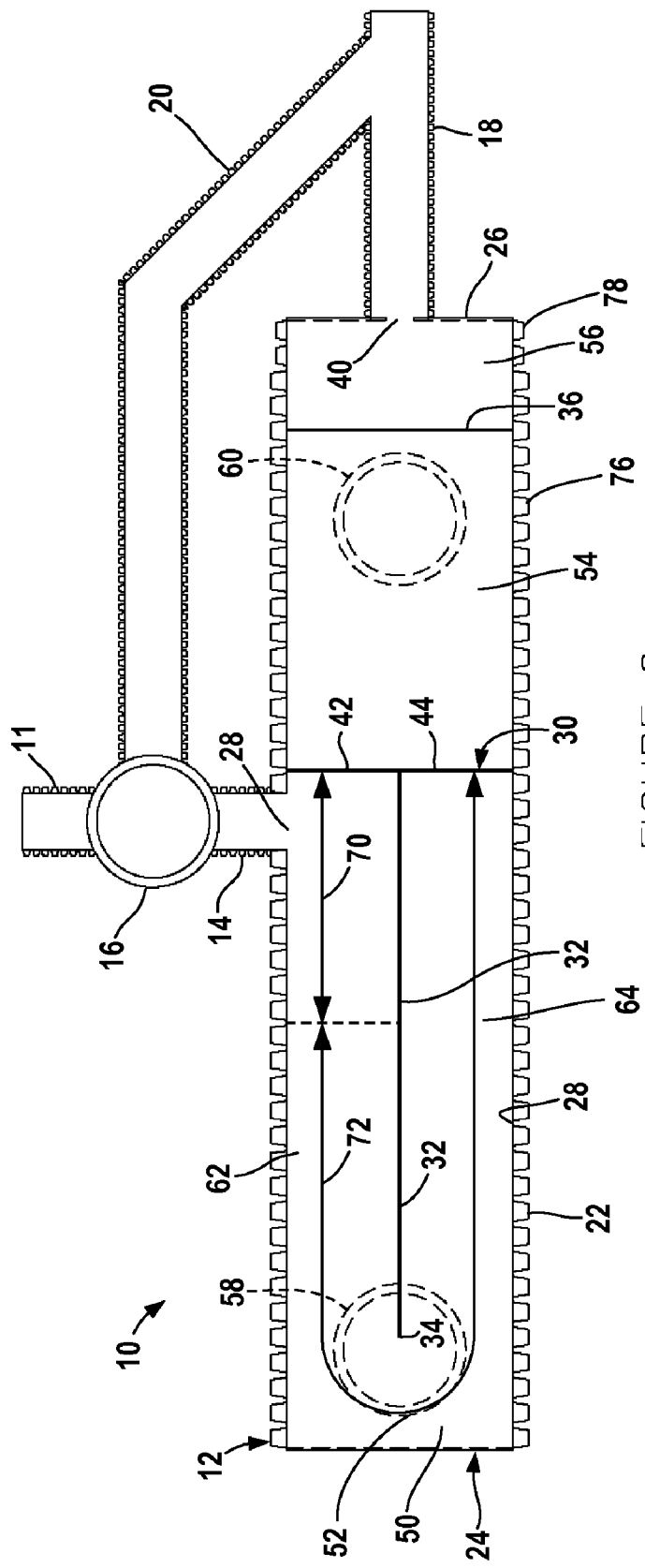
FIG. 2 is a substantially horizontal sectional view of the stormwater treatment system shown in FIG. 1.

The operation of storm water treatment system 10 will now be described. Stormwater flows through collection conduit 11 to riser 16 and from the riser 16 through conduit 14 and inlet port 28 into the upstream end of leg 62, along straight turbulent flow expansion portion 70 of chamber 50 extending from wall 42 approximately 20% of the distance along the length of chamber 50. See FIG. 2. J-shaped laminar flow sediment portion 72 of chamber 50 extends from the downstream end of turbulent flow portion 70 along leg 62, around the U or reverse bend in the chamber at opening 52 and then along leg 64 to wier edge 46 at wall 44.

Heavier than water solids entrained in the laminar flow of water along portion 72 settle under the influence of gravity and are collected at the bottom of the portion. Sediment portion 72 has a length greater than the distance between bulkheads 24 and 30. When the turbulent flow portion 70 extends 20% of the length of the sediment chamber 50, the laminar flow portion 72 has the length of approximately 80% of the chamber or about 1.8 times the distance between bulkheads 24 and 30. The length of the turbulent flow portion 70 may vary somewhat depending upon velocity of water discharged into chamber 50.

Water flowing into chamber 50 fills the chamber and then flows over weir dam 46 into oil chamber 54. Oil and lighter than water contaminants are collected in the oil chamber 54. Clean water flows from oil chamber 54 under plate 36 and into clear water chamber 56 for discharge through opening 40 into conduit 18.

When stormwater flows through conduit 18 at a rate beyond the capacity of separator 12, the level of water rises in riser 16 and excess water flows directly through bypass conduit 20 for discharge into conduit 18.

The separator 12 efficiently settles heavier than water contaminants from stormwater by providing a long, U-shaped sediment chamber 50 having a J-shaped laminar flow portion 72 with a length greater than the distance between the bulkheads 24 and 30 at the ends of the chamber. The long laminar flow portion 72 of the sediment chamber increases the length of time laminar water flows along the chamber and, correspondingly, provides a longer time for contaminants to settle to the bottom of the chamber 50 under the influence of gravity.

The laminar flow portion 72 of the sediment chamber has an essentially uniform flow cross-section along its length. Accordingly, water flowing through the laminar flow portion 72 is not substantially accelerated or decelerated to due to changes in flow cross section of the chamber 50. Acceleration and deceleration of flow produces turbulence which prevents gravity settling of heavier than water contaminants. The distance between end 34 of plate 32 and bulkhead 24 is selected to assure the cross sectional flow area through the opening 52 is essentially equal to the cross sectional flow areas of legs 62 and 64 on either side of plate 32.

Illustrated body 22 is formed from commercially available high-density polyethylene (HDPE) corrugated piping having a smooth cylindrical inner liner 80 to promote flow through the body. The body may have an interior diameter of 42 inches or 48 inches, an axial length of 20 feet, and a wall thickness of about ¼ inches. Larger diameter metal piping having diameters between 60 inches and 144 inches are also commercially available and could be adapted for use with the present invention. Smaller diameter bodies could also be used. Body 22 may be formed from a single 20-foot length of pipe, but lengths of pipe can be joined together in other embodiments. Body 26 has standard corrugations 76 and reduced diameter corrugations 70 adjacent one end of the body (see FIG. 2) for joining adjacent lengths of pipe. Illustrated bulkheads 24, 26 and 30 and plates 32 and 36 formed from HDPE plate, although other materials could be used. Inlet conduit 18 and discharge conduit 22 can be of the pipe size normally used for storm drain design, typically one foot to two feet in diameter. Larger diameter conduit can be used in other installations as needed, particularly when larger diameter piping is also used.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A separator for removing pollutants from stormwater, the separator comprising:
an elongate hollow body, a first bulkhead at one end of the body, a second bulkhead at the other end of the body, and an interior bulkhead between the first and second bulkheads;
a vertical wall located in the center of the body, the wall joined to the bottom of the body and to the interior bulkhead, the wall extending from the interior bulkhead toward the first bulkhead, an opening adjacent the first bulkhead communicating the legs to either side of the wall to define a U-shaped sedimentation chamber having legs to either side of the wall and a reverse bend at the opening;
a stormwater inlet port opening through the body to flow stormwater into one of the sedimentation chamber legs adjacent the interior bulkhead;
a weir dam in the interior bulkhead at an end of the other of the legs;
an oil chamber in the body adjacent to the interior bulkhead;
a clean water chamber in the body adjacent the second bulkhead;
a siphon plate in the body between the oil chamber and the clean water chamber; and
a discharge opening in the second bulkhead; wherein the sedimentation chamber has a flow length greater than the distance between the first bulkhead and the interior bulkhead.

2. The separator as in claim 1 wherein the sediment chamber includes a straight turbulent flow portion adjacent to the inlet port and a J-shaped laminar flow portion having two straight legs, the sediment chamber extending from the turbulent flow portion through the opening and to the weir dam.

3. The separator as in claim 2 including a first riser on the top of the body, said first riser opening into the sedimentation chamber and a second riser on the top of the body, said second riser opening into the oil chamber.

4. The separator as in claim 2 wherein the length of the turbulent flow portion is about 20% of the length of the sediment chamber.

5. The separator as in claim 4 wherein the sedimentation chamber has the same flow area to either side of the wall.

6. The separator as in claim 5 wherein said body has the uniform cross section between the first bulkhead and the interior bulkhead.

7. The separator as in claim 1 including an inlet conduit joined to the inlet port, an outlet conduit joined to the discharge opening and a bypass conduit extending between the inlet conduit and the discharge conduit.

8. The separator as in claim 1 wherein said body is cylindrical.

9. The separator as in claim 1 wherein said body and said plate are each formed from HDPE.

10. A separator for treating stormwater comprising:
an elongate hollow body having opposed body ends, a bulkhead between the body ends, and a vertical wall located in the center of the body, the wall extending along the length of the body between the legs from the bulkhead to a wall end spaced from one body end to provide an opening;
a U-shaped sediment chamber in the body, the U-shaped chamber having a first leg on one side of the body, a second leg on the other side of the body and a U-bend joining the legs, said U-bend located adjacent said one body end and extending through the opening, each sediment chamber leg bounded by the vertical wall and one side of the body, each sediment chamber leg having a uniform flow area along the length of the leg, the flow areas to the legs being essentially equal, the sediment chamber including a straight, turbulent flow portion extending from the bulkhead toward the opening and a J-shaped laminar flow portion extending from the end of the turbulent flow portion toward the opening, around the U-bend and back to the bulkhead;
an inlet, the inlet opening into the first leg of the sediment chamber bend adjacent the bulkhead to flow stormwater into the sediment chamber;
the bulkhead including a wier dam discharge located at the end of the second leg away from said one body end, the discharge to flow stormwater out of the sediment chamber and into an oil chamber;
an oil chamber in the body adjacent the discharge to separate oil from the stormwater;
a clear water chamber in the body adjacent to the oil chamber to receive clear water from the oil chamber;
a siphon plate between the oil chamber and the clear water chamber; and
a discharge opening in the body adjacent to the clear water chamber for discharging clear water from the body.

11. The separator as in claim 10 wherein said body is cylindrical and said legs are straight.

12. The separator as in claim 11 wherein said oil chamber extends across the width of the body.

13. The separator as in claim 12 wherein said clear water chamber extends across the width of the body.

14. The separator as in claim 11 wherein the turbulent flow portion has a length of about 20% of the length of the sediment chamber.

15. The method of treating stormwater to remove heavier than water and lighter than water contaminants, the method comprising the steps of:
(a) providing an elongate hollow body having closed ends;
(b) flowing stormwater with heavier than water and lighter than water contaminants into the body through an inlet located away from the ends of the body;
(c) flowing the turbulent water from one inlet along a first portion of a sediment chamber toward one end of the body to expand the flow of stormwater and remove turbulence;
(d) flowing the non-turbulent water from the first portion of the sediment chamber along a J-shaped laminar flow portion of the sediment chamber toward the one end of the body, around a U-turn at the one end of the body and then in an opposite direction away from said one end of the body to a weir plate while gravity separating heavier than water contaminants from the water, and collecting the heavier than water contaminants on the bottom of the sediment chamber;

(e) flowing the water and lighter than water contaminants over the weir plate and into an oil chamber in the body, and collecting the lighter than water contaminants in the oil chamber;
(f) flowing water from the oil chamber under a siphon plate and into a clear water chamber; and
(g) flowing treated water out of the clear water chamber.

16. The method of claim 15 including the step of:
(h) providing a divider wall between the first portion and the second portion of the sediment chamber and moving the water in opposite directions along opposite sides of the wall.

17. The method of claim 16 including the step of:
(i) flowing the water along the second portion of the sediment chamber without accelerating or decelerating the water.

18. The method of claim 17 including the step of:
(j) flowing the water in opposite directions along two straight parallel legs of the sediment chamber located to either side of the wall.

* * * * *